United States Patent
Trigiani et al.

(10) Patent No.: US 6,469,300 B1
(45) Date of Patent: Oct. 22, 2002

(54) APPARATUS AND METHOD FOR INJECTING A CONCENTRATED FLUORESCENT DYE INTO A SEALED AIR-CONDITIONING SYSTEM

(75) Inventors: Phil Trigiani, Mississauga (CA); Tony Ferraro, Mississauga (CA)

(73) Assignee: UView Ultraviolet Systems, Inc., Mississauga (CA)

( * ) Notice: Subject to any disclaimer, the term of this patent is extended or adjusted under 35 U.S.C. 154(b) by 199 days.

(21) Appl. No.: 09/654,867

(22) Filed: Sep. 5, 2000

(51) Int. Cl.[7] .............................................. G01T 1/161
(52) U.S. Cl. ........................................ 250/302; 73/40.7
(58) Field of Search ............................ 250/302; 73/40.7

(56) References Cited

U.S. PATENT DOCUMENTS

| | | | |
|---|---|---|---|
| 4,938,063 A | * 7/1990 | Leighley | ...................... 73/40.7 |
| 5,357,782 A | 10/1994 | Henry | |
| 5,440,919 A | 8/1995 | Cooper | |
| RE35,370 E | 11/1996 | Henry | |
| RE35,395 E | 12/1996 | Henry | |
| 5,650,563 A | 7/1997 | Cooper et al. | |
| 5,674,000 A | 10/1997 | Kalley | |
| 5,681,984 A | 10/1997 | Cavestri | |
| 5,742,066 A | 4/1998 | Cavestri | |
| 5,959,306 A | 9/1999 | Kalley et al. | |
| 5,979,226 A | * 11/1999 | Cavestri et al. | ............... 73/40.7 |
| 6,101,867 A | * 8/2000 | Cavestri | ...................... 73/40.7 |
| RE36,951 E | 11/2000 | Cooper et al. | |
| 6,178,809 B1 | * 1/2001 | Cavestri | ...................... 73/40.7 |
| 6,392,227 B1 | * 5/2002 | Banyard et al. | ............. 250/302 |

FOREIGN PATENT DOCUMENTS

EP 0 778 936 B1 6/2000

* cited by examiner

Primary Examiner—Bruce Anderson
(74) Attorney, Agent, or Firm—Bell, Boyd & Lloyd LLC

(57) ABSTRACT

An apparatus and a method for injecting a concentrated fluorescent dye into a sealed air-conditioning system prior to the system going into service are revealed. The apparatus is made of a heated reservoir connected to a heated hose which is connected to a heated injector. The method involves heating a fluorescent dye to form a molten liquid fluorescent dye, maintaining the liquid fluorescent dye at a constant temperature and viscosity and injecting the liquid fluorescent dye into a component of a sealed air-conditioning system prior to the system going into service.

20 Claims, 3 Drawing Sheets

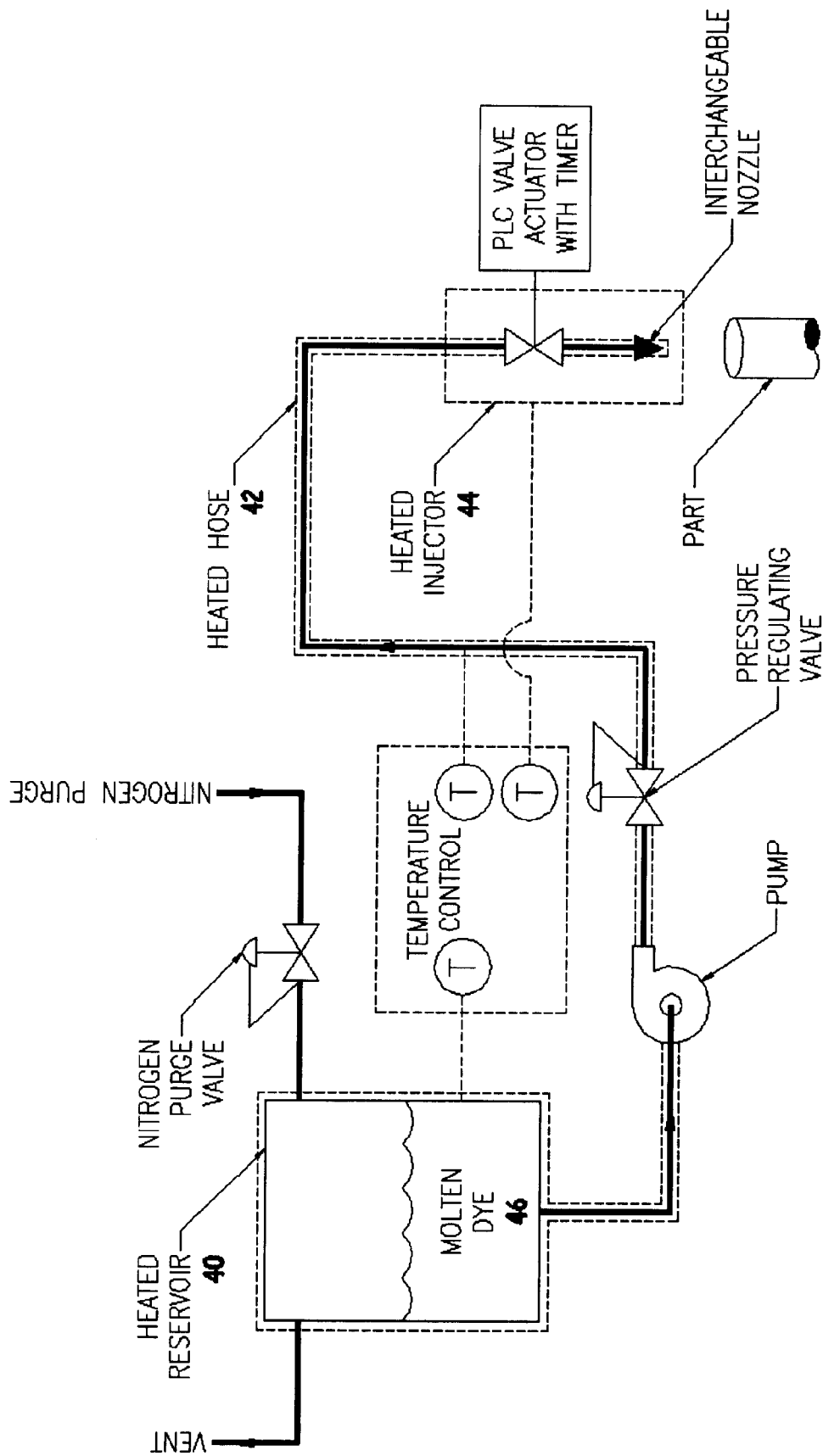
FIGURE 3: DYE INJECTION SYSTEM

APPARATUS AND METHOD FOR INJECTING A CONCENTRATED FLUORESCENT DYE INTO A SEALED AIR-CONDITIONING SYSTEM

BACKGROUND OF THE INVENTION

1. Field of the Invention

This patent application is for an apparatus and method for injecting a concentrated fluorescent dye into a sealed air-conditioning system prior to the system going into service.

2. Description of the Related Art

The Montreal Protocol, the Kyoto Protocol and environmental pressures have resulted in the prohibition against the venting of air-conditioning refrigerants into the air. As a result, air-conditioning systems have become much more efficient and lighter. These smaller air-conditioning systems have very critical charges of refrigerant. Because of the higher efficiency and reduction in size, the system charge of refrigerant has been reduced by about 50% (approximately 500 grams or less of refrigerant compared to a typical 1 kg charge of 10 years ago). Future systems will have even smaller and more critical charges probably around 100–200 grams.

Detecting leaks in air-conditioning systems has become of paramount and key importance for vehicle manufacturers in order to keep customers comfortable and to reduce warranty costs. With more and more vehicle manufacturers wanting to install detection dyes in the air-conditioning systems at their factories, pressure to reduce the costs have been placed on the detection industry.

Leak detection, materials detection and qualitative non-destructive testing are well suited to techniques employing fluorescence detection. These techniques rely upon the unique physical property of various materials to fluoresce when excited by certain wavelengths of visible or ultraviolet (UV) light.

It is a well-known phenomenon that electromagnetic energy within the near ultraviolet spectrum of approximately 315 to 400 nanometer wavelengths produces fluorescence in certain materials. That is, the fluorescent materials absorb radiated energy at the near UV or blue wavelengths and re-radiate or emit it at a longer wavelength in the visible spectrum. Thus, when fluorescent material absorbs electromagnetic energy in a specific excitation frequency band in a specific wavelength range, the material can emit electromagnetic energy in a characteristic fluorescent emission frequency band within the visible light spectrum. This phenomenon has enabled inspection and detection techniques in which fluorescent dyes, inks or pigments are illuminated by lamps selectively filtered to emit only ultraviolet radiation (invisible to the human eye) and then re-radiate with a high luminescence in the visible spectrum.

For example, the slow leakage of refrigerant from an air conditioning system is difficult to locate by any other means. The reason for the difficulty is because the refrigerant escapes as an invisible gas at such a low rate with rapid diffusion that the concentration of refrigerant in air near the leak site is difficult to differentiate from that surrounding any other location along the system circulation lines. However, by infusing into the circulating system a small amount of fluorescent dye that is soluble in the refrigerant, the dye is carried out of the system with the refrigerant and glows brightly at the leak site when the area is swept with a UV lamp (see, for example, U.S. Pat. No. 5,357,782, U.S. Pat. No. Re. 35,370, U.S. Pat. No. Re. 35,395, and U.S. Pat. No. 5,681,984).

A similar procedure can be used to locate leaks of other fluids, such as lubricants, oils, fuels, heat transfer fluids or hydraulic fluids. Other UV inspection techniques use fluorescent dyes or paint to detect fissures or stress cracks in structural members.

Some dyes are most concentrated in a powder form. Each different type of dye medium that is produced obviously adds cost and volume to each application. Typically, the automotive detection industry uses napthalene or naphthalamide. For example, the dye may be Fluorescent Yellow 43. The dye powder is blended into a solution using aromatic solvents and non-solvent lubricants so that the dye is more easily injected and can be quickly taken into solution with the refrigerant lubricant in the system. This solution is better suited for the after market and service sectors for its ease of installation.

Another concern is the time that it will take for enough of the dye to be in circulation so that the vehicle manufacturer can detect any leaks within a short period of operation (one minute or less) at the completion of the assembly process. Two factors in this time problem are the insertion location for the dye and the physical form, i.e., liquid, powder, solid, swatch, capsule, etc., of the dye which effects the ability to dissolve the dye into the circulating refrigerant and oil mixture solution of the air-conditioning system. The desired insertion location for the dye is near the compressor or the high-pressure side of the system (see FIGS. 1 and 2). These locations will offer the most heat and turbulence that will facilitate rapid dissolution of the dye into the refrigerant, thereby allowing near instant leak detection.

The typical dye application is done when the air-conditioning system is charged with refrigerant and lubricant mixture. The dye is usually in a blended solution with lubricant and is injected against the pressure of the static refrigerant system (see, for example, U.S. Pat. Nos. 5,699,678, 5,826,636 and 6,050,310). These methods and associated apparatuses are fine for after market and field service repairs but are time consuming and not cost effective at the automotive manufacturing level.

There has been some application of dye at the automotive manufacturing level. For example, U.S. Pat. No. 5,650,563 discloses a method for installing a concentrated dye, using a liquid dye that is absorbed into a swatch. The cost of this method is problematic. First, a dye powder must be formulated into a solution. There are costs associated with the swatch and the labor to install the dye onto the swatch. In addition, there are problems associated with the physical size for shipping these products, handling of the swatch and the limited areas of an automotive air-conditioning system where the swatch can be installed. In addition, the swatch must be installed in a low-pressure component, e.g., accumulator or filter, of the system.

Furthermore, this method takes a longer time for the dye to go into solution, thus meaning a longer time to run on the assembly line before leaks can be detected. Moreover, this process is not conducive to automation and requires operators to manually insert the swatches or wafers into a system component before assembly.

The goal of the present apparatus and method is to have a dye material fixed to an interior wall or component of the system so that the dye can be installed by a tier 1 or tier 2 supplier of parts or components to the vehicle assembly plant. The present invention uses a more concentrated dye powder without any additional or formulating materials added. For example, a one pound cube of dye will be enough dye for over 2000 vehicles. The present method will keep down the production costs and will result in simpler freight handling for each customer. The powder can be preformed or melted into solid blocks or capsules to simplify handling and inventory.

SUMMARY OF THE INVENTION

The present application discloses an apparatus and a method for injecting a concentrated fluorescent dye into a sealed air-conditioning system prior to the system going into service. The apparatus comprises a heated reservoir, where a concentrated dye is melted to form a concentrated liquid fluorescent dye; a heated hose, wherein the heated hose has a first end and a second end and where the heated reservoir is connected to the first end of the heated hose; and a heated injector, where the heated injector is connected to the second end of the heated hose.

In preferred embodiments of the apparatus, the heated reservoir has a temperature between 150° C. and 205° C., the heated hose has a temperature between 160° C. and 210° C. and the heated injector has a temperature between 160° C. and 210° C. In a more preferred embodiment, the heated reservoir is sealed within a nitrogen blanket.

In other preferred embodiments, the apparatus further comprises a microprocessor to precisely control the timing and volume of injection, a sensor, i.e., optical, proximity, contact, magnetic or microswitch, for preventing injection outside the desired component and a manual trigger for injecting the liquid fluorescent dye.

In yet other preferred embodiments, the heated injector is air assisted and has a spray pattern selected from the group consisting of a stream, a spray and combinations thereof.

The method for injecting a concentrated fluorescent dye into a sealed air-conditioning system prior to the system going into service comprises heating a fluorescent dye to form a liquid fluorescent dye; maintaining the liquid fluorescent dye at a constant temperature and viscosity; and injecting the liquid fluorescent dye into a component of a sealed air-conditioning system prior to the system going into service.

In preferred embodiments of the method, the heating step is performed in a heated reservoir having a temperature between 150° C. and 205° C., the maintaining step is performed at a temperature between 150° C. and 210° C. and the injecting step is performed at a temperature between 160° C. and 205° C.

In more preferred embodiments of the method, the heated reservoir is sealed with a nitrogen blanket, the injecting step is performed with a heated injector that has a spray pattern selected from the group consisting of a stream, a spray and combinations thereof and the heated injector is air controlled.

In other preferred embodiments of the method, the injecting step is controlled by a microprocessor and is initiated by applying a physical force to a manual trigger.

BRIEF DESCRIPTION OF THE DRAWINGS

FIG. 3 is a diagram of the apparatus of the present invention showing the heated reservoir, the heated hose and the heated injector.

DETAILED DESCRIPTION

Figure 1:
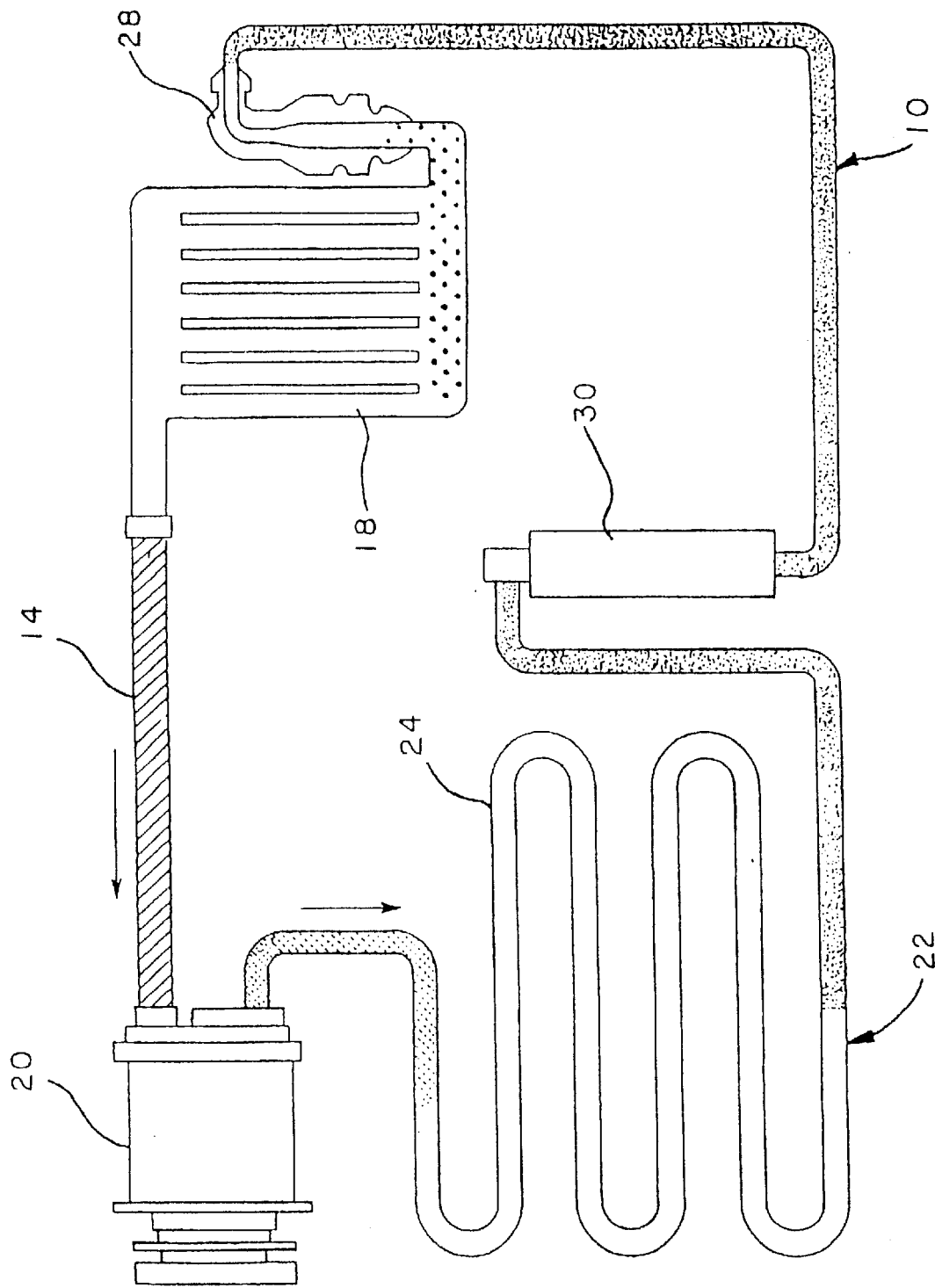
FIG. 1 is an illustration of a basic refrigeration system of an automotive air-conditioning system.
Figure 2:
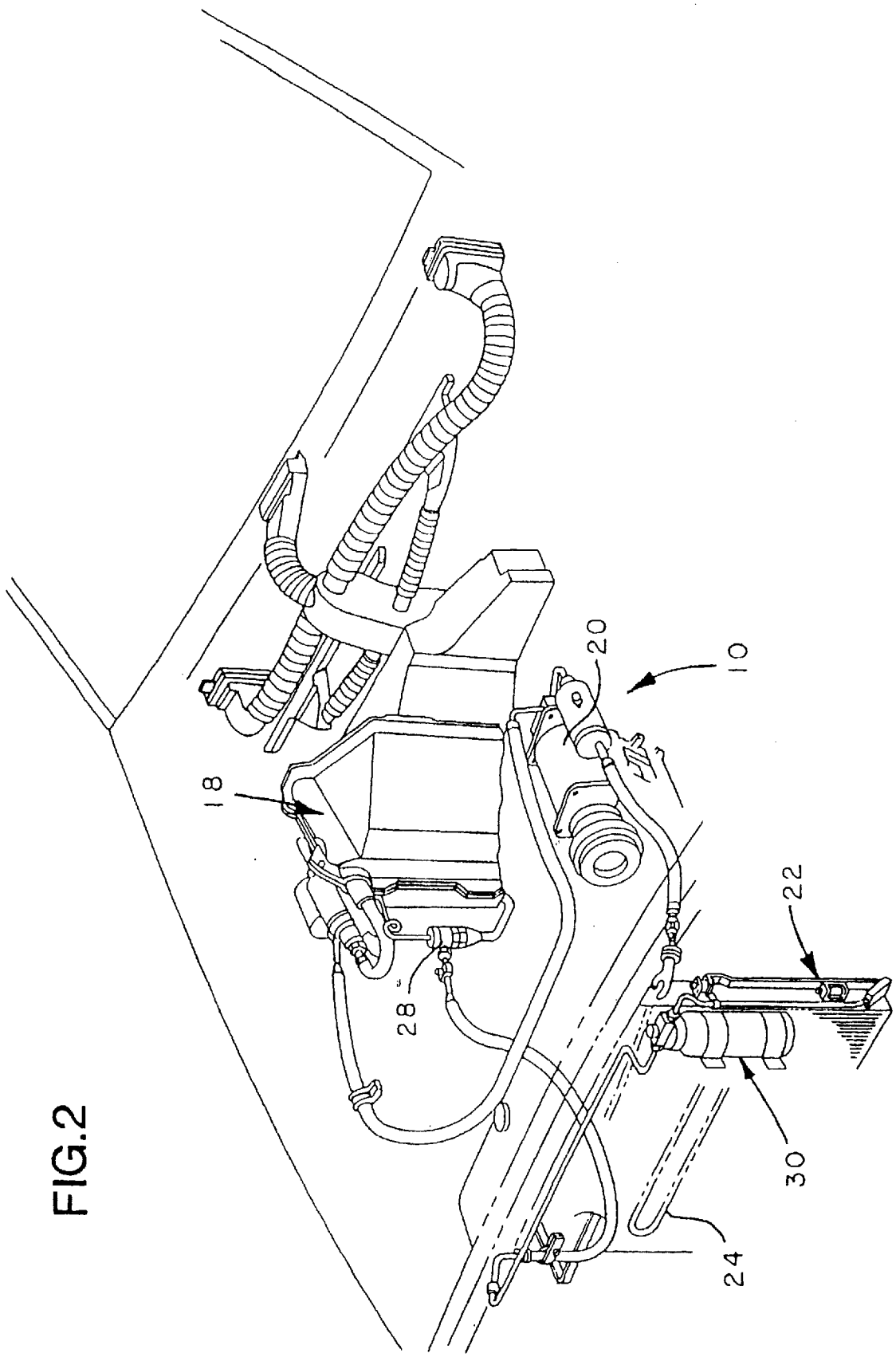
FIG. 2 is a perspective view of an automotive air-conditioning system showing the major components.

Referring to the drawings in detail, wherein like numerals, indicate like elements, FIG. 1 illustrates a basic automotive air-conditioning system 10, by which air inside a vehicle is cooled, cleaned and dehumidified. FIG. 2 provides greater detail of the system as it is arranged in a vehicle.

A refrigerant 14, such as R-12, R134a, a hydrocarbon (HC) or carbon dioxide ($CO_2$), circulates under pressure in the air-conditioning/refrigeration system. In each cycle, the refrigerant is caused to change phase from liquid to gas and back to liquid, absorbing heat from the passenger compartment of the vehicle and releasing heat outside the compartment.

More specifically, the air conditioning system has an evaporator 18 unit where sub-cooled liquid refrigerant enters and is allowed to expand and absorb heat from warm air of the passenger compartment, causing the refrigerant to vaporize. The warm air of the passenger compartment is connected to the evaporator 18 via ducting, as seen in FIG. 2, such that cooled and dried air is re-circulated into the passenger compartment. After absorbing heat from the passenger compartment, the refrigerant gas is drawn from the evaporator 18 by suction into a compressor 20, which compresses the gas, thereby raising its pressure and temperature. The high-pressure hot vapor is passed through a condenser 22, in which the vapor is exposed to a large cooling-surface area by flowing through a labyrinth of finned-coils 24 over which outside air is rapidly blown to transport heat away from the vapor. The refrigerant 14 cools to the condensation temperature, releases its heat of condensation and changes phase back to a hot liquid, still at a high pressure. The refrigerant 14 completes the cycle by passing through a thermostatic expansion valve 28, which controls the high pressure liquid refrigerant 14 as a low pressure spray into the evaporator 18.

In some systems, it is necessary to reservoir the liquid refrigerant before it is metered through the expansion valve because the demand of the evaporator varies under varying conditions. In other systems, it is a practice to install an accumulator between the evaporator and compressor so that no liquid can enter the compressor. In either system, water contamination in the refrigerant can cause the water vapor to freeze at the point of expansion, causing refrigerant flow to be blocked, and to react with refrigerants to form acids that may cause internal damage to metal parts. Consequently, in the depicted embodiment, a receiver-dehydrator, also referred to as a receiver-drier, 30 is located between the condenser 22 and the evaporator 18 to reservoir the refrigerant and remove moisture from it. In other air-conditioning systems, an accumulator-dehydrator may be located between the evaporator and compressor to accumulate the refrigerant vapor and remove moisture from it.

The present invention provides for an apparatus and method for injecting a concentrated fluorescent dye into a sealed air-conditioning system prior to the system going into service. The actual dye is most concentrated in a powder or solid precast form. By keeping the dye in its most concentrated state, a very small amount is required for detection, about 150 milligrams for a typical automotive air-conditioning system containing about 200 ml of lubricating oil.

The dye powder is heated to form a sticky liquid. This liquid is maintained at a constant temperature and viscosity so that it can be accurately injected into a component of the air-conditioning system. Compressing the powder into a tablet or caplet has some disadvantages in that the tablet must be secured in a component and prevented from flowing through the system. Otherwise, the tablet or caplet can lodge in some small orifice and cause catastrophic failure of the system within its first few minutes of operation. Also, the tablet/caplet can fall out of the component prior to it going into the final assembled vehicle if it is not properly fixed to the interior wall. This adds further cost to the application and the product.

The present apparatus for injecting a concentrated dye into an air-conditioning system prior to use at the automotive manufacturing level has a heated reservoir 40, a heated hose 42 and a heated injector 44. Thus, the present apparatus maintains the liquid dye 46 at a constant temperature and viscosity. A microprocessor-based controlled injection ensures automatic and accurate injection. This device can be triggered with a sensor, e.g., optical, proximity, contact, magnetic or microswitch, so that its operation is fully automatic with no user interface. The device can also be used manually with a foot or hand operated component so that an operator can used controlled injection. The amount injected is maintained and consistent. A trigger merely initiates the injection process.

The heated reservoir can be recharged with powder dye or the dye can be added in a solid block form. The powder is preheated and formed into blocks. This allows easier transportation and handling of the dye. Also, the desired volume can be achieved for a daily block without the need for on-site measuring equipment. The heated hose connects the heated injector to the heated reservoir. The heated injector can be air assisted or can have a variety of different spray patterns depending on the desired outcome.

The hot sticky liquid (melted) dye is injected into a component of the air-conditioning system by the automotive manufacturer or by a designated component supplier prior to assembly and system use. The material sticks to the sidewall of aluminum, rubber or other material component of the system and solidifies. The air-conditioning system may be shipped to a vehicle assembly plant and then installed on the vehicle. When the air-conditioning system is evacuated and recharged on the assembly line, refrigerant and oil are added to the sealed system.

A variety of testing has been done with the present apparatus and it has been observed that the optimum temperature in the heated reservoir is between 150° C. and 205° C. The optimum temperature in the heated hose and heated injector is slightly higher, i.e., between 160° C. and 210° C. In order to maintain the chemical integrity of the dye, we have sealed the reservoir with a nitrogen blanket to prevent any oxidation of the hot dye in the liquid state.

The cycle times vary with the nozzle opening of the injector but we have been able to inject for about 60 milliseconds and repeat this sequence each second for a near continuous output. A counterbalanced injection arm can be installed in a robotics assembly line and be oriented to inject automatically into an air-conditioning component.

The molten dye can be injected anywhere in the system but it is preferable to inject the dye on the high pressure side of an air-conditioning system where added turbulence assists in rapid dye diffusion. The current preferred method uses a manual trigger and the dye is injected into a component of the air-conditioning system, such as an orifice tube, a line, fitting or condenser assembly, thereby coating the interior wall of the component with dye.

EXAMPLES

The following examples are included to demonstrate preferred embodiments of the invention. It should be appreciated by those skilled in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the concept, spirit and scope of the invention.

More specifically, it will be apparent that certain components, which are both physically and structurally related, may be substituted for the components described herein while the same or similar results would be achieved. All such similar substitutes and modifications apparent to those skilled in the art are deemed to be within the spirit, scope and concept of the invention as defined by the appended claims.

Example 1

The present invention was tested using a heated reservoir, a heated hose and a heated injector. 180 milligrams of solid fluorescent dye (Part 190 980007, UView Ultraviolet Systems, Inc., Mississauga, Canada) were added to a reservoir covered with a nitrogen blanket and heated to 155° C. to form a molten dye. The temperature of the molten dye in the heated reservoir was 154° C. The heated reservoir was connected to an electrically heated 16 foot hose assembly and heated nozzle. The temperature of the heated hose and heated nozzle was 177° C. The molten dye was then injected onto aluminum coupons.

A coated coupon was installed into a sight glass assembly and inserted inline on a Denso air-conditioning system. The system is a custom air-conditioning test bench that was custom-built using components from a 1992 Honda air-conditioning installation kit. The system was then charged with 13 ounces of R-12 refrigerant. A second sight glass assembly was positioned upstream to the dye filled sight glass. The air-conditioning system was then started and an ultraviolet light was used to view the time when the dye was detectable in the second sight glass assembly. The dye was routinely detectable in 10–20 seconds. These results show the rapid diffusion of the dye with this method and that complete system protection can be obtained very quickly.

Example 2

The coated coupon used in Example 1 was analyzed to determine if there were any chemical changes to the dye. Spectrophotometric analysis revealed that the fluorescent strength was the same as that for the original powder sample. These results indicated that there was no degradation of the fluorescent dye after being subjected to the melting and re-melting procedures.

Example 3

Testing was performed for two major tier 1 automobile suppliers. The results from these tests have been successful in a hose assembly and in aluminum tube assemblies. The following components were injected using the present method and apparatus and sent back to the manufacturers for validation: formed aluminum hose manifold assemblies, block fittings for condensers, and tube inlets and outlets for condensers. These products met the manufacturers' expectations of fluorescence, application and feasibility.

Example 4

Tests were conducted at Spauschus Associates, Stockbridge, Ga., for material compatibility, fluorescence, wear and viscosity. Oil samples were prepared by melting the dye powder from Example 1 at 150° C. The melted dye was allowed to cool and solidify. The dye was then ground into a powder and dissolved in oil to produce the recommended concentration.

Sealed tube tests were performed using metal coupons for common automotive air-conditioning materials (steel, copper and aluminum), plastics (polytetrafluoroethylene or PTFE, nylon and polyester) and elastomers (neoprene, hydrogenated acrylonitrile butadiene rubber or HNBR and ethylene propylene diene monomer or EPDM). The samples were aged at 150–175° C. for 14–30 days. No adverse effects were caused by the dye presence compared to controls without dye. Fluorescence, viscosity and wear tests also showed no adverse effects. Therefore, melting and solidifying the dye had no adverse effect on its fluorescence and no adverse effects on the air-conditioning components.

While the invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the appended claims.

Thus, it is to be understood that variations in the present invention can be made without departing from the novel aspects of this invention as defined in the claims. All patents and articles cited herein are hereby incorporated by reference in their entirety and relied upon.

What is claimed is:

1. An apparatus for injecting a concentrated fluorescent dye into a sealed air-conditioning system prior to the system going into service, comprising:
   a) a heated reservoir, wherein a concentrated fluorescent dye is melted to form a concentrated liquid fluorescent dye;
   b) a heated hose, wherein the heated hose has a first end and a second end and wherein the heated reservoir is connected to the first end of the heated hose; and
   c) a heated injector, wherein the heated injector is connected to the second end of the heated hose.

2. The apparatus of claim 1, wherein the heated reservoir has a temperature between 150° C. and 205° C.

3. The apparatus of claim 1, wherein the heated hose has a temperature between 160° C. and 210° C.

4. The apparatus of claim 1, wherein the heated injector has a temperature between 160° C. and 210° C.

5. The apparatus of claim 1, wherein the heated reservoir is sealed within a nitrogen blanket.

6. The apparatus of claim 1, further comprising a microprocessor to control injector time.

7. The apparatus of claim 1, further comprising a sensor to automatically trigger the injector.

8. The apparatus of claim 1, wherein the heated injector is air assisted.

9. The apparatus of claim 1, wherein the heated injector has a spray pattern selected from the group consisting of a stream, a spray and combinations thereof.

10. The apparatus of claim 1, further comprising a manual trigger for injecting the liquid fluorescent dye.

11. A method for injecting a concentrated fluorescent dye into a sealed air-conditioning system prior to the system going into service, comprising the steps of:
   a) heating a fluorescent dye to form a liquid fluorescent dye;
   b) maintaining the liquid fluorescent dye at a constant temperature and viscosity; and
   c) injecting the liquid fluorescent dye into a sealed air-conditioning system component prior to the system going into service.

12. The method of claim 11, wherein the heating step is performed in a heated reservoir having a temperature between 150° C. and 205° C.

13. The method of claim 12, wherein the heated reservoir is sealed with a nitrogen blanket.

14. The method of claim 11, wherein the maintaining step is performed at a temperature between 150° C. and 210° C.

15. The method of claim 11, wherein the injecting step is performed at a temperature between 160° C. and 205° C.

16. The method of claim 11, wherein the injecting step is controlled by a microprocessor.

17. The method of claim 11, wherein the injecting step is performed with a heated injector.

18. The method of claim 17, wherein the injecting step is performed with a heated injector that has a spray pattern selected from the group consisting of a stream, a spray and combinations thereof.

19. The method of claim 17, wherein the heat injector is air controlled.

20. The method of claim 11, wherein the injecting step is initiated by applying a physical force to a manual trigger.

* * * * *